United States Patent [19]

Kobayashi

[11] Patent Number: 5,227,760
[45] Date of Patent: Jul. 13, 1993

[54] STRAIN GAGE

[76] Inventor: Toshihiro Kobayashi, 11, Yasudadori 3-chome, Showa-ku, Nagoya City, Japan

[21] Appl. No.: 767,389

[22] Filed: Sep. 30, 1991

[30] Foreign Application Priority Data

Sep. 29, 1990 [JP] Japan .............................. 2-102566[U]

[51] Int. Cl.⁵ ................................. G01L 1/22
[52] U.S. Cl. ................................. 338/2; 338/3; 338/5; 73/862.625
[58] Field of Search .............. 338/3, 2, 4, 5, 6; 177/211; 73/862.65, 766, 708, 862.67

[56] References Cited

U.S. PATENT DOCUMENTS 4,747,456 5/1988 Kitagawa et al. .................. 177/211
4,777,826 10/1988 Rud, Jr. et al. ..................... 338/4 X

FOREIGN PATENT DOCUMENTS 56-76001 6/1981 Japan .

Primary Examiner—Marvin M. Lateef

[57] ABSTRACT

A strain gage includes four gages that constitute a bridge circuit, and at least one resistance device which is used to adjust the offset voltage of the bridge circuit formed by the four gages. The resistance device is disposed on the strain gage between one of the gages making up the bridge circuit and a terminal thereof. Finally, each resistance device disposed on the strain gage has a series of resisting elements which vary in size and which are connected in parallel fashion.

6 Claims, 4 Drawing Sheets

STRAIN GAGE

BACKGROUND OF THE INVENTION

The present invention relates to a strain gage and in particular to a strain gage used for detecting a physical quantity such as pressure, acceleration, force or load.

One of the conventional strain gages is disclosed in Japanese Patent Laid-open Print No. 56 (1981)-76001 which was published in 1981 without examination. In detail, as shown in FIG. 4, a strain gage 100 for detecting the deformation of a deformable portion 200 includes a detecting resistance 104 which is connected, in series, to an adjusting resistance menas 103 having resistances 101 and 102 both of which are connected each other in parallel. The adjusting resistance means 103 is on a rigid portion. The resistance 101 (102) has plural taps 105 (106) each of which is used as a terminal. After the strain gage 100 is mounted on the portion 200, one of terminals 105 (106) is selected for the establishment of the balance in the Wheatstone bridge.

However, in the foregoing conventional strain gages, it is very cumbersome to prepare plural taps or terminals relating to each resistance of the adjusting resistance device, which brings the enlargement of the strain gage per se.

SUMMARY OF THE INVENTION

It is, therefore, a primary object of the present invention to provide a strain gage without the foregoing drawbacks.

It is another object of the present invention to provide a strain gage in which the terminals are reduced in the number in comparison with the conventional strain gage.

In order to accomplish the foregoing objects, a strain gage is comprised of four gages constituting a bridge and adjusting resistance device having plural resisting elements which are connected in parallel to be disposed between one of gages and a terminal thereof for adjusting the offset voltage of the bridge.

BRIEF DESCRIPTION OF THE DRAWINGS

The above-listed problems and other objects, features and advantages of the present invention as will be become more apparent and more readily appreciated from the following detailed description of preferred exemplary embodiment of the present invention, taken in connection with the accompanying drawings, in which.

DETAILED DESCRIPTION OF THE PREFERRED EMBODIMENT

Figure 1:
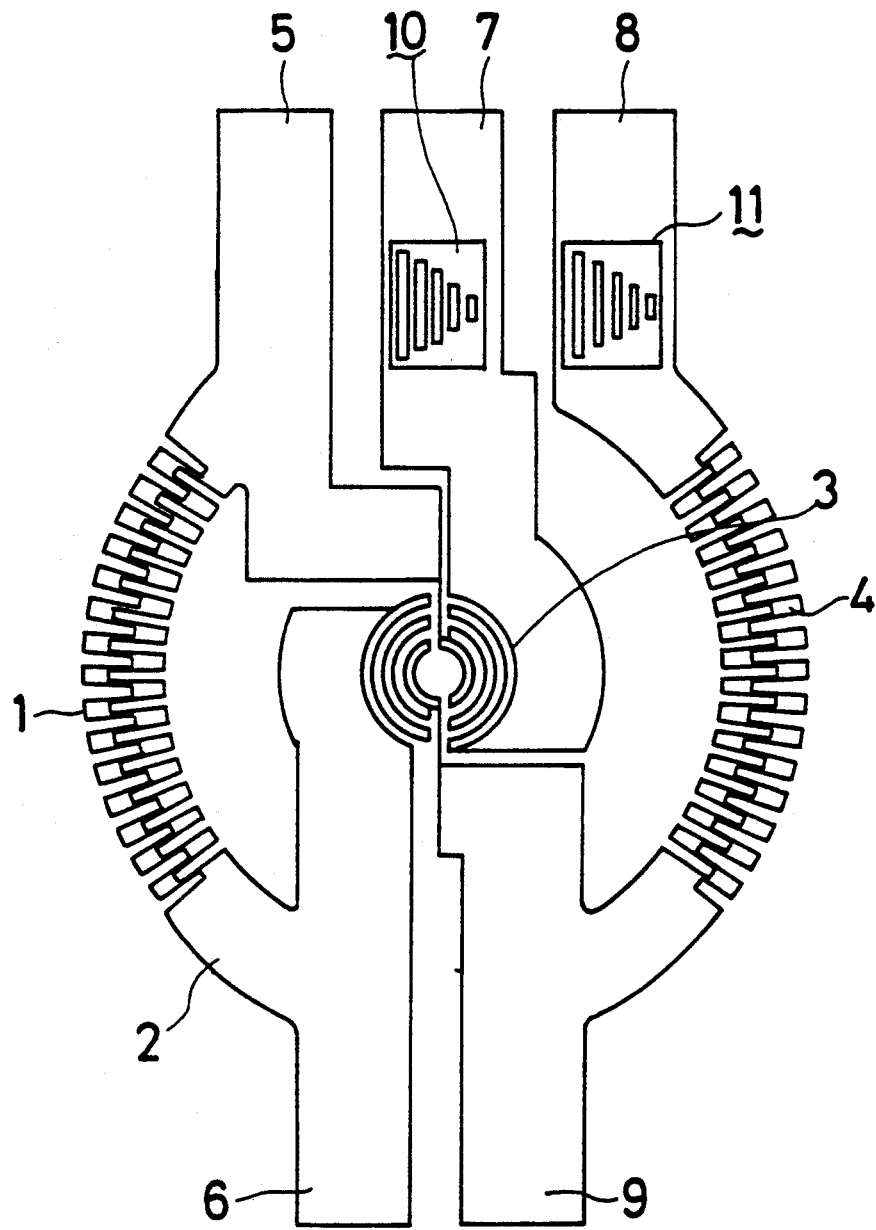
FIG. 1 is a plane view of a strain gage in the form of a pressure sensor according to the present invention.

Referring now to FIG. 1, a pressure sensor 90 includes four strain gages 1, 2, 3 and 4 which constitute a Wheatstone bridge and four terminals 5, 6, 7, 8 and 9 to be connected with a power supply or an amplified circuit. A resistance 10 (11) for adjusting the offset-voltage is located between the terminal 7 (terminal 8) and the strain gage 3 (strain gage 4).

Figure 2:
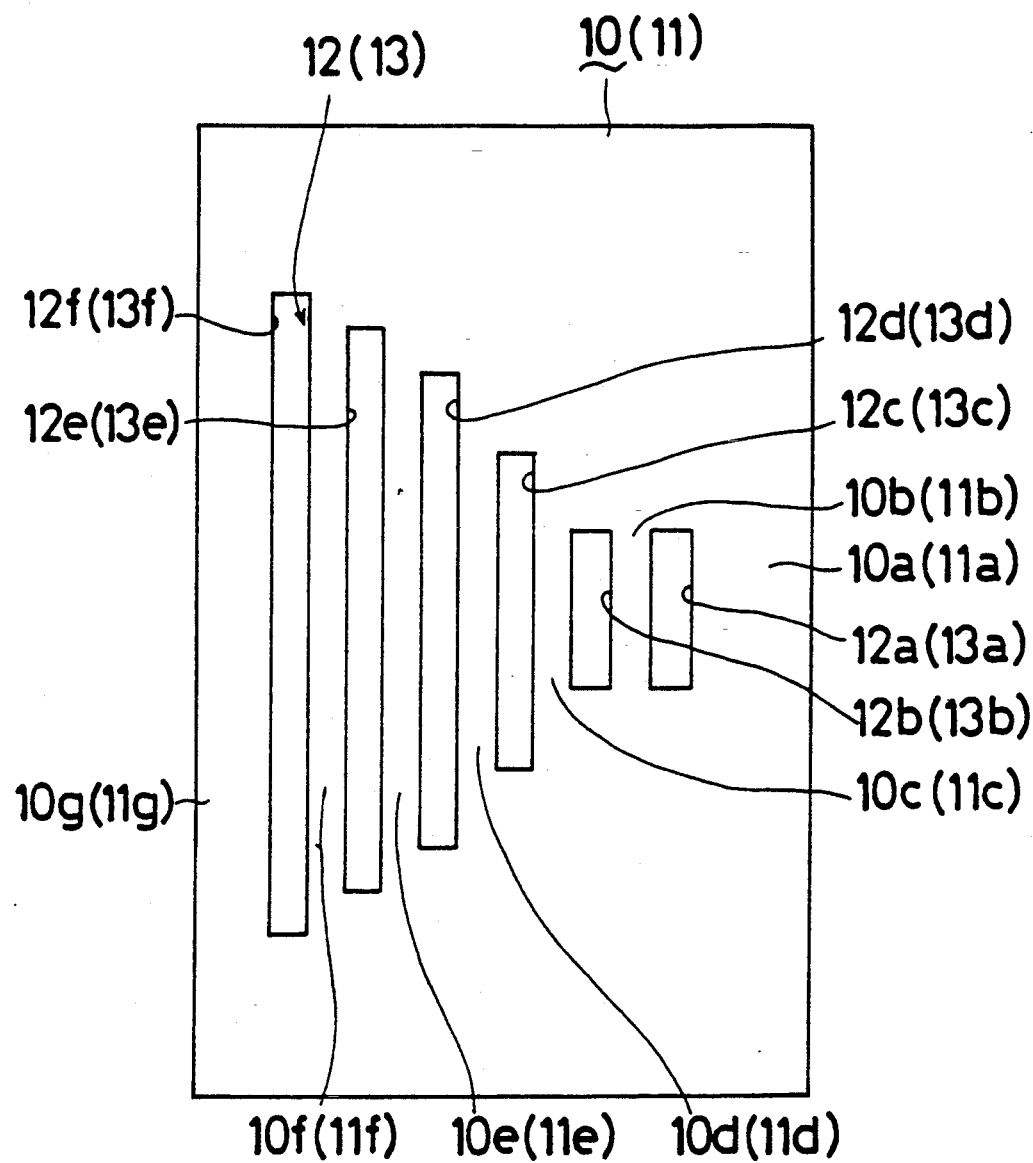
FIG. 2 shows a gage pattern in the pressure sensor shown in FIG. 1.
Figure 3:
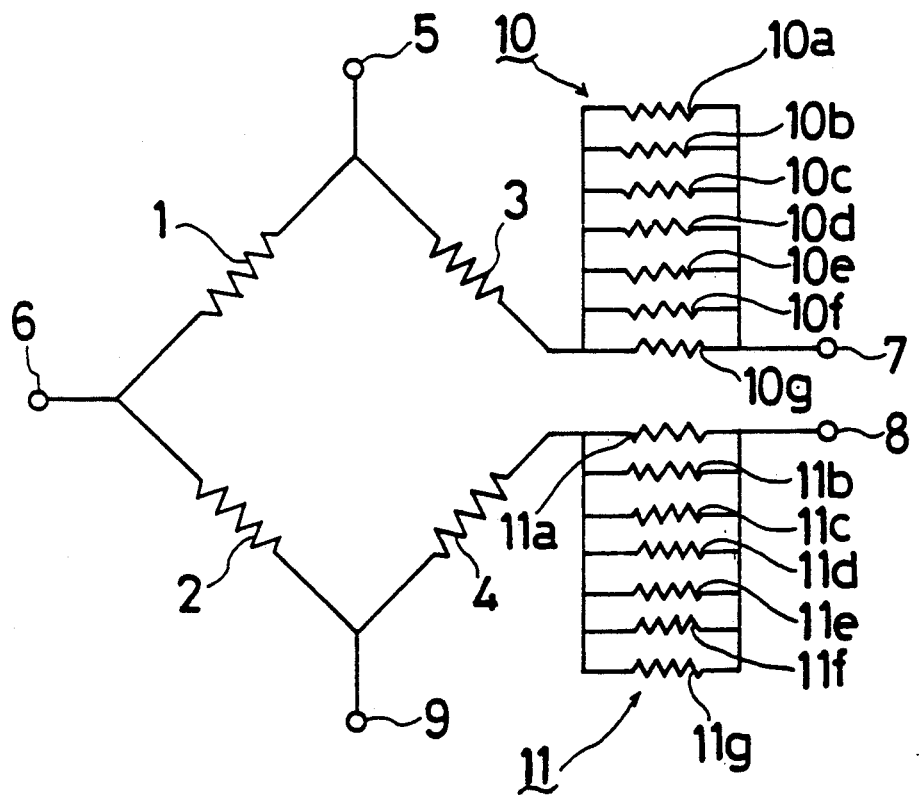
FIG. 3 shows a circuit of a strain gage according to the present invention which is in the form of a pressure sensor.
Figure 4:
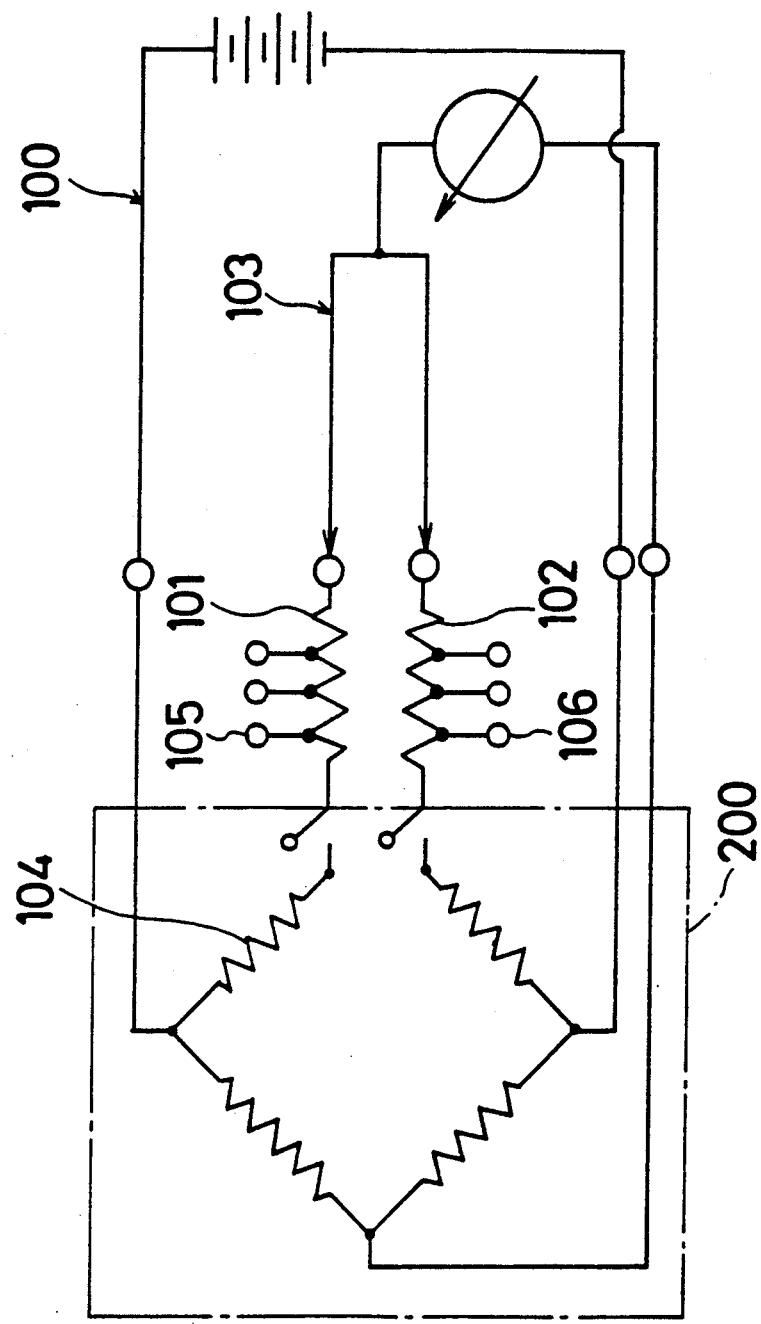
FIG. 4 shows a circuit of a conventional strain gage.

Referring now to FIG. 2, the resistance 10 (11) includes a plurality of equi-spaced slits $12a$, $12b$, $12c$, $12d$, $12e$ and $12f$ ($13a$, $13b$, $13c$, $13d$, $13e$ and $13f$) which are defined so as to constitute a plurality of equi-spaced and parallelly connected resisting elements $10a$, $10b$, $10c$, $10d$, $10f$ and $10g$ ($11a$, $11b$, $11c$, $11d$, $11e$ and $11f$). This definition is made in order that each resistance 10 (11) may be able to assure the gradual and equi-difference voltage change. In detail, each resistance includes a plurality of parallely connected elements $10a$ through $10g$ ($11a$ through $11g$) each of which is oriented in the vertical direction in FIG. 2. The condition in FIG. 2 illustrates in the ordinary circuit as shown in FIG. 3. For adjusting the value of each resistance 10 (11) in FIG. 3, any one or more elements are set to be removed from between the terminal 7 (8) and strain gage 3 (4). In order to realize the foregoing adjustment of each resistance 10 (11) in FIG. 2, it is established by cutting each element to be removed in the horizontal direction in the laser beam method.

It is noted that strain gages 1 through 4 each which is in the form of a thin film, of an alloy of nickel-cobalt or neckel-ferrous is formed on an insulating base member (not shown) such as a glass member. For the protection of each pattern gage, a layer of SiO is used which covers it. Construction of each resistance 10 (11) is made simultaneously with the formation of each gage. In regard to the formation of the resistance 10 (11), laser beam is used and each of elements $10a$ through $10g$ ($11a$ through $11g$) is formed one by one based on the previously measured offset voltage.

Referring now to FIG. 3, the correction or adjustment of the offset voltage is established by cutting one or more resisting elements $10a$ through $10g$ ($11a$ through $11g$) as follows: In order to determine or fix each resisting element ($10a$-$10g$, $11a$-$11g$), the following procedure is employed. When it is assumed that the values of the strain gages 1, 2, 3 and 4 are represented as R1, R2, R3 and R4 respectively, the values of the resistances 10 and 11 are represented as the summation of R10(i) and the summation of R11(i) (i=1,2, - - - N) respectively and the target value of the offset voltage 0 mV under the constant value of the power supply voltage, the equation of R1=R2=R3+R10(i)=R4+R11(i) is established. For the more simplification, it is assumed that R3=R4 and R10(i)=R11(i).

Next, if resisting elements of the resistance 10 are cut one by one with leaving the resistance as it is and vice versa, a change of (N−1) a mV is required. If (N−1) th element and Nth element are left as they are, a change of (N−2)a mV is required.

Thus, the followings are derived.

$$\left( \frac{R2}{R1+R2} - \frac{R4+R11(1)}{R3+R10(1)+R4+R11(1)} \right) V_{cc} -$$

$$\left( \frac{R2}{R1+R2} - \frac{R4+R11(N)}{R3+R10(1)+R4+R11(N)} \right) V_{cc} =$$

$$\left( \frac{1}{2} - \frac{1}{2} \right) V_{cc} - \left( \frac{1}{2} - \frac{R4+R11(N)}{2R} \right) V_{cc} =$$

$$\frac{R+R11(1)-R11(N)}{2R} V_{cc}$$

By setting N, a, Vcc, R and R4, R11(10) can be obtained and by calculating $(N-2)a \times 1000$ and $(N-3)a \times 1000$, R11(N-1), R11(N-2) - - - are obtained. Thus, based on the following equation, $$R11(N-1) = \frac{R11(N)\{R11 - (N-1)\}}{R11(N) + R11 - (N-1)}$$

R11−(N−1) is obtained and in turn each value of the elements can be fixed. Similarly, each element of the resistance can be obtained.

Even though the width of the pattern, length and related factors of each resistance 10 (11) are defined based on the fixed value, due to error in manufacturing process, the offset voltage may sometimes deviate from the ideal one. In case of the deviation in the direction of +(−), based thereon, the required numbers of element of the resistance R10 (R11) are to be cut. Thus, the offset voltage can be within a range from −a/2 through a/2.

Obviously, numerous modifications and variations of the present invention are possible in light of the above teachings. It is therefore to be understood that within the scope of the appended claims, the invention may be practised otherwise than as specifically described herein.

What is claimed is:

1. A strain gage comprising:
   four gages constituting a bridge; and
   adjusting resistance means for adjusting the offset voltage of said bridge, said adjusting resistance means having a plurality of resisting elements which are disposed in parallel between one of said four gages and a terminal thereof, said plurality of resisting elements being arranged in such a manner that the resistance value of each element of said plurality of resisting elements is distinct and increases in turn toward the last resisting element of said plurality of resisting elements in order such that a disconnection of said each element of said plurality of resisting elements may bring about a constant change in voltage across said bridge.

2. A strain gage according to claim 1, wherein the difference in value between any two adjacent elements is constant.

3. A strain gage according to claim 1, wherein said disconnection of each resisting element is established by using a laser beam.

4. A strain gage according to claim 1, wherein said plurality of resisting elements is arranged in such a manner that the length of said each element increases in turn toward said last resisting element.

5. A strain gage according to claim 1, wherein said each element of said plurality of resisting elements is distinct in size in relation to all other elements of said plurality of resisting elements.

6. A strain gage according to claim 1, wherein the size of said each element of said plurality of resisting elements is distinct and is within a range of sizes from a longest size to a shortest size.

* * * * *